(12) United States Patent
Hawkes et al.

(10) Patent No.: US 9,573,184 B2
(45) Date of Patent: Feb. 21, 2017

(54) DEEP ROLLING TOOL FOR PROCESSING BLADE ROOT

(71) Applicant: UNITED TECHNOLOGIES CORPORATION, Farmington, CT (US)

(72) Inventors: Justin R. Hawkes, Marlborough, CT (US); Andrzei Ernest Kuczek, Bristol, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/567,575

(22) Filed: Dec. 11, 2014

(65) Prior Publication Data

US 2015/0165515 A1 Jun. 18, 2015

Related U.S. Application Data

(60) Provisional application No. 61/917,579, filed on Dec. 18, 2013.

(51) Int. Cl.
*B21H 7/16* (2006.01)
*B21B 39/14* (2006.01)
(Continued)

(52) U.S. Cl.
CPC .............. *B21H 7/16* (2013.01); *B21B 27/02* (2013.01); *B21B 31/02* (2013.01); *B21B 39/14* (2013.01);
(Continued)

(58) Field of Classification Search
CPC .............. B21H 7/16; C21D 7/08; C21D 7/04; B23P 9/04; B23P 9/02; B23P 9/00; B24B 39/00; B24B 39/003; B24B 39/02; B24B 39/023; B24B 39/04; B24B 39/045; B24B 39/06; B21B 39/14; B21B 31/02

See application file for complete search history.

(56) References Cited

U.S. PATENT DOCUMENTS 3,983,734 A 10/1976 Walig
5,666,841 A * 9/1997 Seeger et al. .................. 72/110
(Continued)

FOREIGN PATENT DOCUMENTS

DE 102004039940 A1 2/2006

OTHER PUBLICATIONS

U.S. Non Final Office Action for U.S. Appl. No. 14/567,555, mailed Jul. 16, 2015, 13 pages.
(Continued)

*Primary Examiner* — Shelley Self
*Assistant Examiner* — Mohammad Yusuf
(74) *Attorney, Agent, or Firm* — Cantor Colburn LLP

(57) ABSTRACT

A device and methods are provided for deep rolling. In one embodiment, a deep rolling tool includes a fork having a base section and a plurality of fork arms, wherein each fork arm extends outwardly from the base section and wherein the fork arms are separated from one another to form an opening. The deep rolling tool may also include a plurality of rolling elements configured to apply a compressive stress to articles received by the deep rolling tool, wherein each rolling element is mounted at the distal end of a fork arm, and wherein each rolling element includes a cantilever shaft retained by a fork arm and a crowned roller.

2 Claims, 5 Drawing Sheets

(51) Int. Cl.
  B21B 27/02 (2006.01)
  B21B 31/02 (2006.01)
  C21D 7/08 (2006.01)
  B23P 9/04 (2006.01)
  B24B 39/00 (2006.01)

(52) U.S. Cl.
  CPC ............... B23P 9/04 (2013.01); B24B 39/003 (2013.01); C21D 7/08 (2013.01)

(56) References Cited

U.S. PATENT DOCUMENTS

| | | | |
|---|---|---|---|
| 5,784,912 A * | 7/1998 | Focken et al. | 72/104 |
| 6,581,430 B2 | 6/2003 | Wilson | |
| 6,792,781 B1 | 9/2004 | Bindernagel et al. | |
| 7,159,425 B2 | 1/2007 | Prevey et al. | |
| 7,237,417 B2 | 7/2007 | Wittig | |
| 7,506,444 B2 | 3/2009 | Weise | |
| 7,600,404 B2 * | 10/2009 | Prevey, III | 72/75 |
| 7,805,972 B2 * | 10/2010 | Prevey, III | 72/407 |
| 7,998,168 B2 * | 8/2011 | Kleimann, Sr. | B08B 9/027 137/15.04 |
| 8,051,565 B2 * | 11/2011 | Luna et al. | 72/75 |
| 8,356,506 B2 | 1/2013 | Szuba | |
| 2002/0033037 A1 | 3/2002 | Grimmel | |
| 2004/0267305 A1 * | 12/2004 | Borgman | A61B 19/34 606/209 |
| 2005/0107230 A1 * | 5/2005 | Ostertag et al. | 72/236 |
| 2012/0216590 A1 | 8/2012 | Szuba | |
| 2013/0167609 A1 * | 7/2013 | Heimann et al. | 72/226 |
| 2013/0186161 A1 * | 7/2013 | El-Wardany | B23P 9/02 72/252.5 |
| 2013/0219982 A1 * | 8/2013 | Feldmann et al. | 72/455 |
| 2014/0326032 A1 * | 11/2014 | Steffens et al. | 72/102 |
| 2015/0165500 A1 | 6/2015 | Hawkes et al. | |
| 2015/0165513 A1 | 6/2015 | Hawkes et al. | |
| 2015/0165514 A1 | 6/2015 | Hawkes et al. | |

OTHER PUBLICATIONS

U.S. Non Final Office Action for U.S. Appl. No. 14/567,562, mailed Jul. 30, 2015, 14 pages.
Non-Final Office Action dated Jan. 13, 2016 for U.S. Appl. No. 14/567,522.
US Final OA, Issued May 2, 2016.
US Final Office Action, Issued Feb. 19, 2016.
US Nonfinal Office Action Mailed Jul. 30, 2015.

* cited by examiner

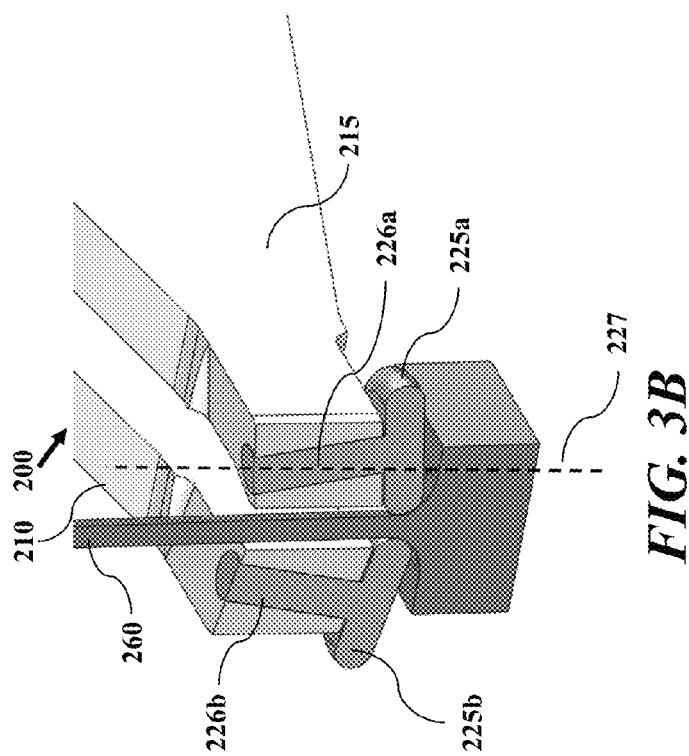
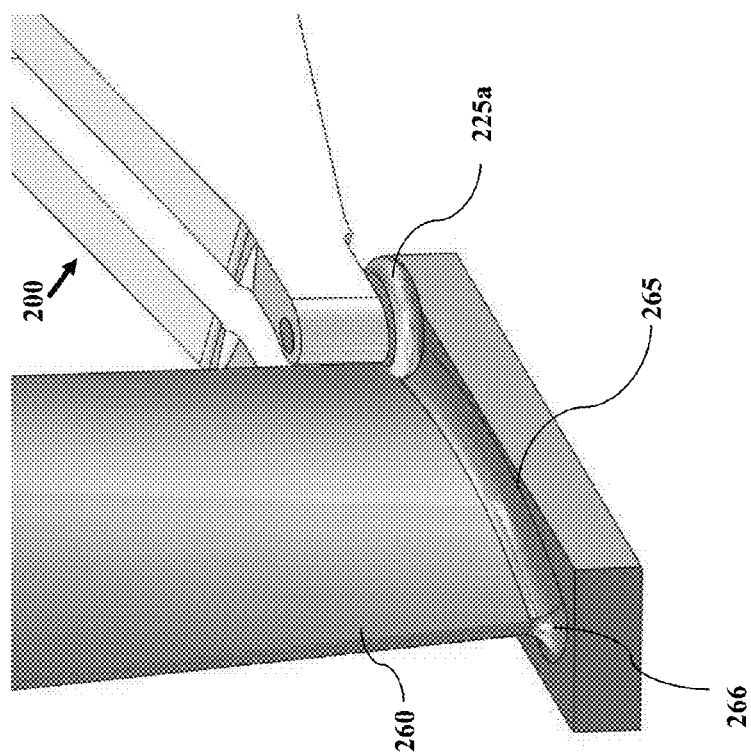
FIG. 3B
FIG. 3A

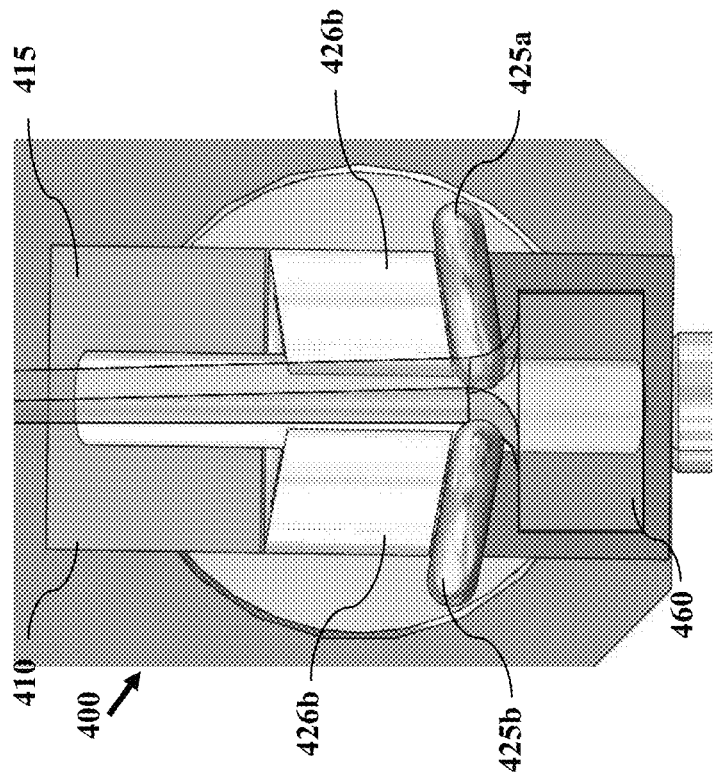
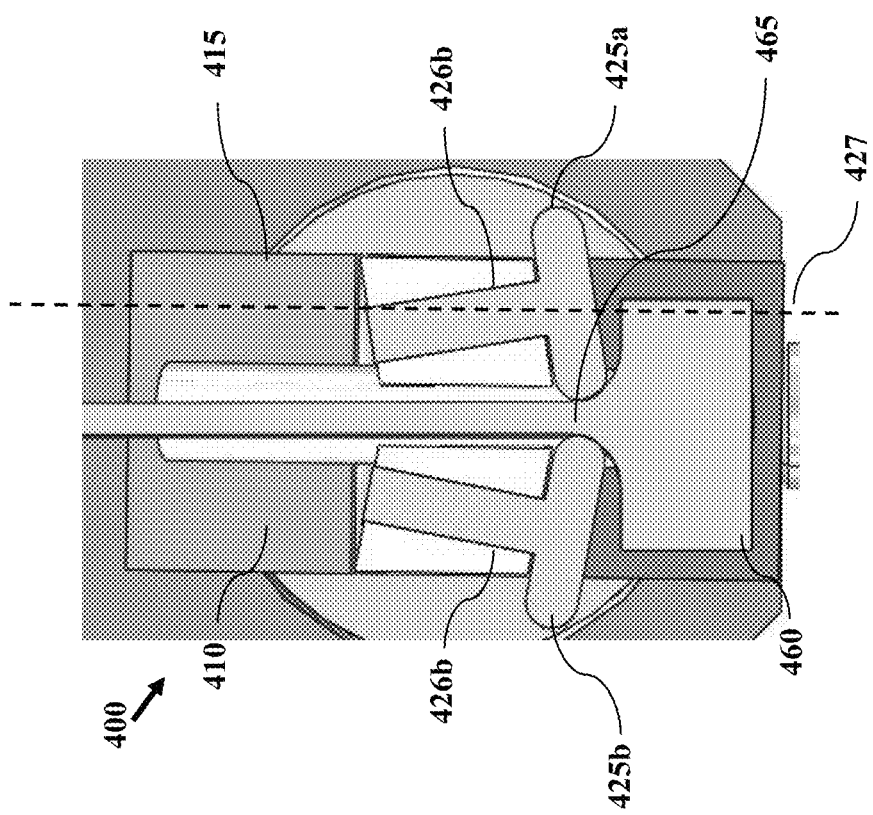

DEEP ROLLING TOOL FOR PROCESSING BLADE ROOT

CROSS-REFERENCE TO RELATED APPLICATIONS

This application claims priority to U.S. Provisional Application No. 61/917,579 filed on Dec. 18, 2013 and titled Deep Rolling Tool for Processing Blade Root, the disclosure of which is hereby incorporated by reference in its entirety.

FIELD

The present disclosure relates generally to machinery, and more particularly to deep rolling tools and methods for enhancing fatigue life.

BACKGROUND

Peening, burnishing, and deep rolling are techniques that are used to induce stress at the surface of a component. Conventional methods may employ some form of caliper to simultaneously pinch opposing sides of a component. These tools, typically referred to as ball point tools, often use a caliper with ball bearings to pinch the component. FIG. 1 illustrates a graphical representation of a conventional hydraulic tool 100 which uses a pressurized hydraulic fluid to provide a clamping force. Hydraulic tool 100 includes hydraulic clamping elements 105 and 110 which are hydraulically actuated. Hydraulic tool 100 is supplied with a pressurized fluid by hydraulic input valve 115. The main problem with hydraulic tools is that they are bulky which makes it difficult to process components. In addition, the use of hydraulic clamping elements 105 and 110 have a small contact zone which requires a lot of passes in order to process a surface, and thus, conventional hydraulic tools are slow. Further, these tools require a high pressure pump which adds to complexity and cost.

A drawback of conventional machining operations of peening/burnishing/deep rolling is that they are typically slow and expensive to perform. Another drawback is that conventional tools are non-adjustable and may not be usable with certain component geometries/thicknesses.

Thus, there is a need for a machine and tool for applying stress to objects.

BRIEF SUMMARY OF THE EMBODIMENTS

Disclosed and claimed herein are a device and methods for deep rolling. In one embodiment, a deep rolling tool includes a fork having a base section and a plurality of fork arms, wherein each fork arm extends outwardly from the base section and wherein the fork arms are separated from one another to form an opening. The deep rolling tool also includes a plurality of rolling elements configured to apply a compressive stress to articles received by the deep rolling tool, wherein each rolling element is mounted at the distal end of a fork arm, and wherein each rolling element includes a cantilever shaft retained by a fork arm and a crowned roller.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIGS. 3A-3B depict graphical representations of a deep rolling tool according to one or more embodiments;

FIGS. 4A-4B depict graphical representations of a deep rolling tool according to one or more embodiments.

DETAILED DESCRIPTION OF THE EXEMPLARY EMBODIMENTS

Overview and Terminology

One aspect of the disclosure relates to a device and methods for deep rolling to improve fatigue life in objects. According to one embodiment, a deep rolling tool is provided including rolling elements, wherein each rolling element includes a cantilever shaft retained by a fork arm and a crowned roller. The crowned rollers may be positioned to provide a localized zone of compressive stress at the surface of a component. In one embodiment, the deep rolling tool and rolling elements are configured to provide compressive stress to bladed elements, and in particular a blade root portion of a bladed element. The deep rolling tool may be configured to provide compressive stress to elements, such as a turbine blade, compressor blade fan blade, bladed disk, object with multiple blades, etc.

According to another embodiment, a machining device is provided including a deep rolling tool. The machining device maybe a milling machine or other device for processing bladed elements, such as turbine blades, compressor blades, fan blades, etc. According to one embodiment, the machining device may be a 5 axis milling machine.

According to another aspect of the disclosure, processes for using a deep rolling tool are discussed below. In one embodiment, a deep rolling tool may be positioned and applied to an article or component. The deep rolling tool may be repositioned and applied to another portions of an article, or to another article. For example, the deep rolling tool may be applied to a bladed element, such as a particular blade of the bladed element, and then repositioned to another blade of the bladed element.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Figure 1:
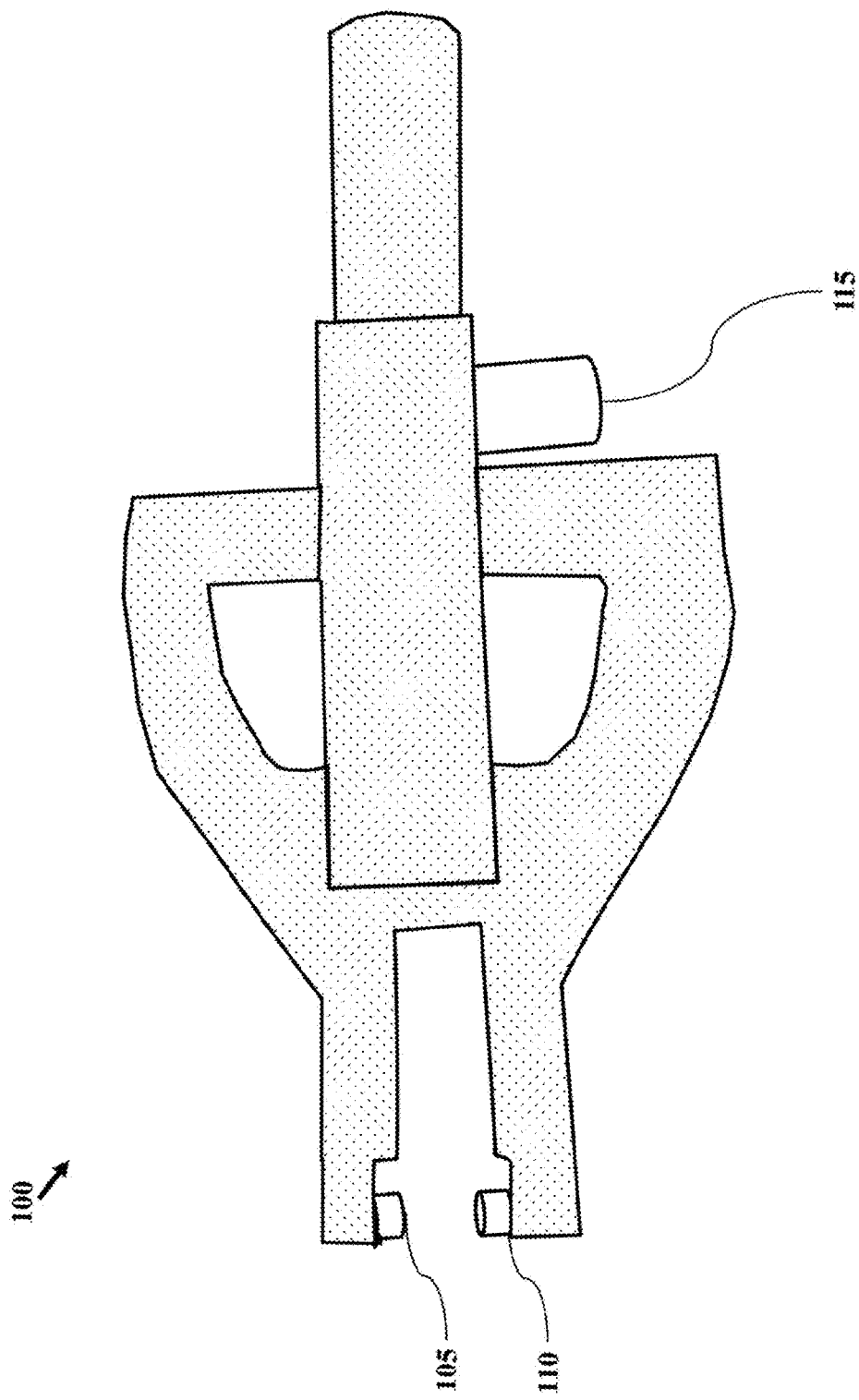
FIG. 1 depicts a conventional hydraulic tool.
Figure 2:
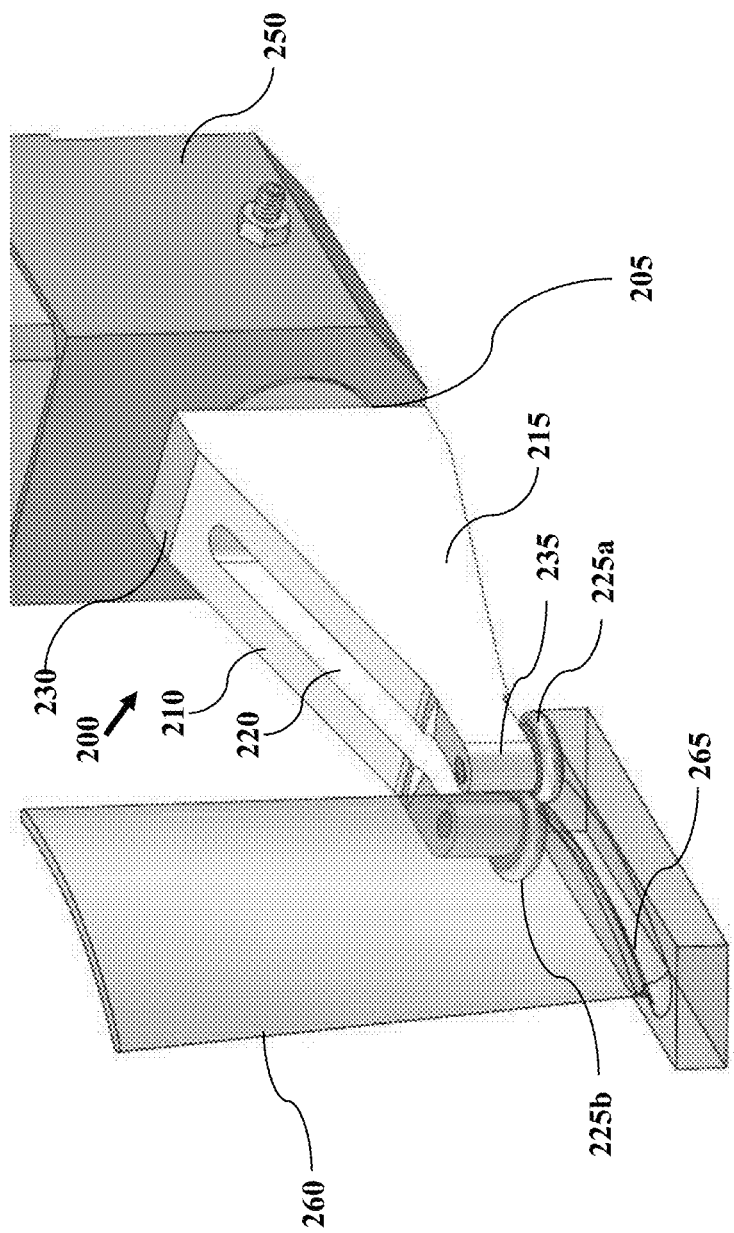
FIG. 2 depicts a deep rolling tool according to one or more embodiments.

Referring now to the figures, FIG. 2 depicts a deep rolling tool according to one or more embodiments. Deep rolling tool 200 may be configured to apply compressive stress with rolling elements. As shown in FIG. 2, deep rolling tool 200 includes a fork 205 with fork arms 210 and 215. Fork arms 210 and 215 extend outwardly from base section 230 and the fork arms are separated from one another to form opening 220. Fork 205 may be a flexible fork tool configured to provide a compressive force based on the flexural stiffness of the plurality of fork arms 210 and 215. The force is applied by expanding fork arms 210 and 215. The force can be tailored to increase non-linearly with expansion. According to one embodiment, deep rolling tool 200 includes a plurality of rolling elements, 225a-225b mounted at the distal end 235 of a fork arm. Rolling elements 225a-225b are configured to apply a compressive stress to articles received by the deep rolling tool.

According to one embodiment, rolling elements 225a-225b each include a cantilever shaft retained and a crowned roller to provide a compressive force based at least on the flexural stiffness of fork arms 210 and 215. As will be discussed in more detail below, each cantilever shaft may be retained by a fork arm. According one embodiment, rolling elements 225a-225b are each positioned/mounted below a bottom surface of fork arms 210 and 215 near or adjacent to the distal ends of the fork arms. In that fashion, rolling elements 225a-225b may each be applied to a bladed element such that the ends of fork arms 210 and 215 apply compressive stress to elements received by rolling elements 225a-225b.

Deep rolling tool 200 is depicted in FIG. 2 mounted to tool holder block 250. In certain embodiments, tool holder block 250 may hold deep rolling toll 200 in a fixed position. In other embodiments, tool holder block 250 may be configured to position deep rolling tool 200. Tool holder block 250 may be configured to rotate fork 205 via a rotary spine to allow for rotation of the deep rolling tool during repositioning, and in some cases during deep rolling.

According to one embodiment, deep rolling tool 200 is configured to apply residual stress to at least one of a turbine blade, fan blade, bladed disk, bladed element and metal object in general. The compressive stress can improve fatigue life of the article, such as a bladed object. Rolling elements 225a-225b apply a residual stress which can inhibit crack propagation in rolled objects.

According to another embodiment, deep rolling tool may be configured to apply a compressive strength to bladed elements, and in particular to the blade root of a bladed element. FIG. 2 depicts deep rolling tool applied to bladed element 260 with the deep rolling tool positioned to be directed along blade root 265. Bladed element 260 is depicted as being transparent for the purpose of illustration. While deep rolling tool 200 has been described as being applied to a blade root, it should be appreciated that deep rolling tool 200 may be applied to other portions of the bladed element, including leading and trailing edges, etc.

In on embodiment, deep rolling tool 200 may be configured to apply a compressive stress to improve at least one of fatigue life of the article, surface finish of the article and aerodynamic performance (e.g., improved compressor efficiency) of the article. With respect to surface finish, the compressive stress and/or rolling by deep rolling tool 200 may improve received articles to allow for a surface finish that is suitable for airfoil applications and combustion engine components such as turbine blades, compressor blades, fan blades, etc. In certain embodiments, deep rolling tool 200 may improve surface finish to allow for a roughness average of 0.5 µm to 10 µm. By improving the surface finish, deep rolling tool 200 may heal surface defects, which also can improve fatigue performance.

FIGS. 3A-3B depict graphical representations of a deep rolling tool according to one or more embodiments. FIG. 3A depicts a portion of deep rolling tool 200 of FIG. 2 and bladed element 260. According to one embodiment, deep rolling tool 200 may be positioned or rolled along the path of the blade root 265. In one embodiment, deep rolling tool 200 may be configured to receive the entire length of bladed element 260 to allow for rolling of the entire blade root towards a root tip 266. The configuration of rolling tool 200 allows for rolling elements, such as rolling element 225, to contact the blade root 265.

FIG. 3B depicts a cutaway view of a cross section of a deep rolling tool 200 including fork arms 210 and 215 and rolling elements 225a-225b. Rolling elements 225a-225b are positioned below fork arms of the deep rolling tool. Rolling elements 225a-225b include crowned rollers and cantilever shafts 226a-226b, the cantilever shafts 226a-226b of rolling elements 225a-225b mounted to fork arms 210 and 215. As show in FIG. 3B, each fork arm includes a mounting hole to receive and retain cantilever shafts 226a-226b of rolling elements 225a-225b. According to one embodiment, crowned rollers of rolling elements 225a-225b may include a minor radius for contacting articles received by the rolling tool, and a major diameter for providing a load capacity. The diameter of each crowned roller may be greater than the diameter of each of the cantilever shafts 226a-226b. In certain embodiments, crowned rollers of rolling elements 225a-225b may include a hollow center portion for coupling to a bushing and/or cantilever shafts.

In one embodiment, cantilever shafts 226a-226b of each rolling element, may be secured to a fork arm, such as fork arms 210 and 215, with roller bushings. Each rolling element includes a center axis and rotates about its center axis, and wherein the center axis of a rolling element may be parallel or non-parallel to the central axis of another rolling element.

According to one embodiment, cantilever shafts 226a-226b of rolling elements 225a-225b may be angularly offset from angularly offset from a central axis, shown as 227 with respect to fork arm 215, of a fork arm.

FIGS. 4A-4B depict graphical representations of a deep rolling tool according to one or more embodiments. FIG. 4A depicts a portion of deep rolling tool 400 and bladed element 460. According to one embodiment, deep rolling tool 400 may be positioned or rolled along the blade root of a bladed element. The configuration of rolling tool 400 allows for rolling elements, such as rolling element 425a, to contact the blade root 465 and provide a compressive stress.

FIG. 4A depicts a cutaway view of a cross section of a deep rolling tool 400 including fork arms 410 and 415 and rolling elements 425a-425b. Rolling elements 425a-425b are positioned below fork arms of the deep rolling tool. Rolling elements 425a-425b include crowned rollers and cantilever shafts 426a-426b, the cantilever shafts 426a-426b of rolling elements 425a-425b are mounted to fork arms 410 and 415. Each fork arm includes a mounting hole to receive and retain cantilever shafts 426a-426b of rolling elements 425a-425b. According to one embodiment, cantilever shafts 426a-426b of rolling elements 425a-425b may be angularly offset from angularly offset from a central axis, shown as 427 with respect to fork arm 415, of a fork arm.

Deep rolling tool 400 (e.g., deep rolling tool 200) is designed to function similarly to commercial hydraulic tools but with simpler, more compact operation and to produce a larger contact zone, thus reducing processing time. According to one embodiment, by using crowned rollers as opposed to ball bearings, it is readily possible to tailor the size of the contact zone by adjusting the minor (crown) radius and including a flat of desired width. The major (roller) diameter can be made sufficiently large to enable the use of a compact roller bearing that has sufficient load carrying capacity negating the need for a hydraulic system. According to preliminary fatigue testing, greater than 10× improvement in fatigue life may be achieved.

Figure 5:
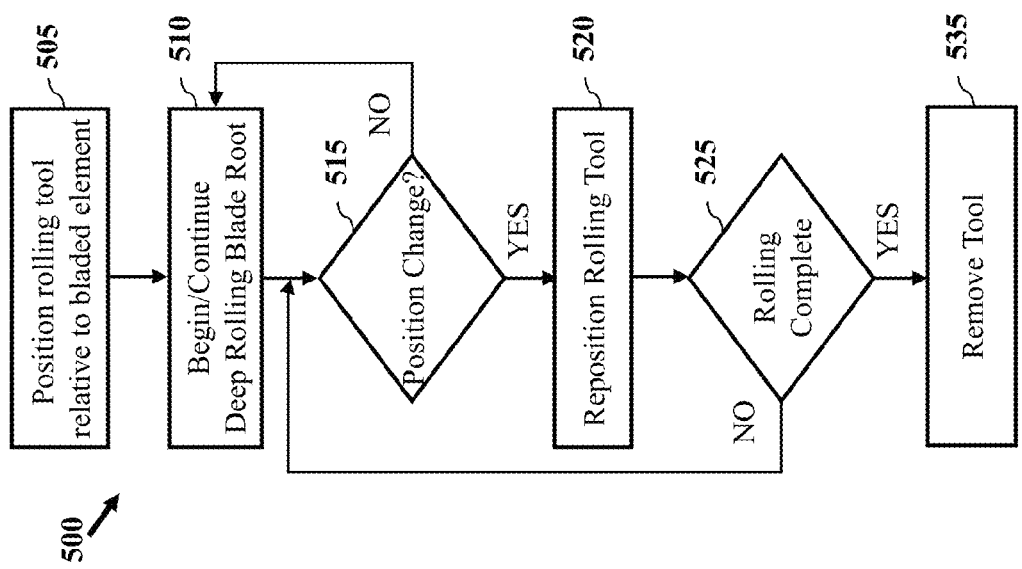
FIG. 5 depicts a process for a deep rolling according to one or more embodiments.

When deep rolling tool 400 is pressed on to the edge of blade 460, the fork arms of deep rolling tool 400 are forced apart which produces a reaction force that is proportional to the amount of deflection. The roller and fork geometry are configured to provide a sufficiently large contact stress to locally yield the blade material generating a residual compressive stress field. According to one embodiment, the residual stress generated by deep rolling tool 400 inhibits crack propagation from the blade edge FIG. 5 depicts a process for a deep rolling tool according to one or more embodiments. Process 500 may be initiated by positioning a deep rolling tool relative to a bladed element at block 505. For example, the deep rolling tool may be applied to the blade root of a bladed element. At block 510, rolling may be initiated for the blade root, or continued in some circumstances. A milling machine may be configured to execute process 500 and may be configured to determine when a position change for the deep rolling tool is required. When a position change is not required (e.g., "NO" path out of decision block 515), the milling machine continues to deep roll at block 510. When a position change is required (e.g., "YES" path out of decision block 515), the milling machine repositions the rolling tool at block 510.

Process 500 may continue with the machine determining if rolling is complete at decision block 525. When rolling is not complete (e.g., "NO" path out of decision block 525), the milling machine continues to deep roll at block 510. When rolling is complete (e.g., "YES" path out of decision block 525), the milling machine removes the rolling tool at block 535.

According to one embodiment, a machine, such as a milling machine includes deep rolling tool (e.g., deep rolling tool 200 or deep rolling tool 400) having a plurality of rolling elements, the rolling elements are configured to apply a compressive stress to articles received by the deep rolling tool, and a positioning element coupled to the deep rolling tool, wherein the positioning element is configured to position the deep rolling tool and apply the deep rolling tool to an article. In certain embodiments, the machine is a 5-axis machine and the positioning element is configured to position the deep rolling tool in three dimensions, and rotate the tool in two dimensions. In one embodiment, a block of the deep rolling tool is mounted to the positioning element, and a fork is perpendicular to the positioning element. The deep rolling tool may be rotated along a central axis of the rolling tool by the positioning element. The positioning element may be configured to move the rolling tool in an alternating motion from a retracted position to an extended position, such as a linear path. Deep rolling may be employed to apply residual stress to at least one of a turbine blade, compressor blade, fan blade, bladed disk, bladed element and metal object in general.

According to another embodiment, a machine, such as a milling machine includes deep rolling tool having a plurality of rolling elements and a positioning element coupled to the deep rolling tool, wherein the positioning element is configured to position and apply the deep rolling tool to a bladed element. The positioning element of the machine may be configured to move the rolling tool in an alternating motion from a refracted position to an extended position, between intermediates positions of the retracted and extended position, and/or in linear and non-linear paths.

While this disclosure has been particularly shown and described with references to exemplary embodiments thereof, it will be understood by those skilled in the art that various changes in form and details may be made therein without departing from the scope of the claimed embodiments.

What is claimed is:

1. A deep rolling tool, comprising:
   a fork having a base section;
   a first fork arm extending outwardly from the base section;
   a second fork arm extending outwardly from the base section, the first fork arm and the second fork arm each having a distal end with respect to the base section;
   an opening extending from the distal end of the first fork arm and the distal end of the second fork arm to the base, the opening being located between the first fork arm and the second fork arm; and
   a first rolling element rotatably mounted to the distal end of the first fork arm via a first cantilever shaft that is angularly offset with respect to an axis of the distal end of the first fork arm, wherein the axis of the distal end of the first fork arm is parallel to the opening;
   a second rolling element rotatably mounted to the distal end of the second arm via a second cantilever shaft that is angularly offset with respect to an axis of the distal end of the second fork arm, wherein the axis of the distal end of the second fork arm is parallel to the opening; and
   wherein the first rolling element and the second rolling element apply a compressive stress to an article when it is located in the opening.

2. The deep rolling tool of claim 1, wherein the fork is a flexible fork tool configured to provide a compressive force based upon a flexural stiffness of the first fork arm and a flexural stiffness of the second fork arm.

\* \* \* \* \*